UNITED STATES PATENT OFFICE.

HERBERT T. KALMUS, OF BROOKLINE, MASSACHUSETTS, ASSIGNOR TO THE EXOLON COMPANY, OF CAMBRIDGE, MASSACHUSETTS, A CORPORATION OF MASSACHUSETTS.

ELECTRIC-FURNACE ABRASIVE AND METHOD OF MAKING THE SAME.

1,149,064.  Specification of Letters Patent.  Patented Aug. 3, 1915.

No Drawing.  Application filed June 11, 1915.  Serial No. 33,609.

*To all whom it may concern:*

Be it known that I, HERBERT T. KALMUS, a citizen of the United States, residing at Brookline, in the county of Norfolk and State of Massachusetts, have invented certain new and useful Improvements in Electric-Furnace Abrasives and Methods of Making the Same; and I do hereby declare the following to be a full, clear, and exact description of the invention, such as will enable others skilled in the art to which it appertains to make and use the same.

This invention relates to an electric furnace abrasive and the method of making the same.

In the production of abrasives for cutting different classes of steels and other hard materials it is essential to control those properties of the product which may be termed abrasive toughness and abrasive fracture. Abrasive toughness is that property of an abrasive by which cutting grains will maintain their cutting action and resist fracture under the cutting compression. Abrasive fracture is that property of an abrasive by which the cutting edges of the grains after becoming dulled while grinding will break with a sharp cutting fracture presenting new cutting edges resembling the original cutting edges of the grains. Abrasives consisting essentially of alumina have been used for grinding the hard metals, but for certain classes of steels the pure alumina abrasive is too brittle and the cutting edges of the grains fail under compression before they become dulled. Other aluminous abrasives have been proposed containing lesser percentage of alumina, the remainder being oxids of titanium, silicon and other oxids. These abrasives, while well suited for some purposes, are inefficient and lack the properties of abrasive toughness and abrasive fracture when cutting some classes of hard steel.

Experiment and microscopic observation show that pure alumina tends to crystallize with a coarse structure which it is very difficult to prevent by any of the practical devices for operating electric furnaces for the production of abrasives. If, however, a certain amount of impurity be present with the alumina, the crystal habit of the alumina may be changed to form a finer crystalline structure, the spaces between the individual alumina crystals being filled with a cementing or bonding material composed of the impurities or of a eutectic of the impurities with alumina. With certain impurities, particularly where silica is present, this cementing structure filling in the spaces between and surrounding the individual crystals of alumina, tends to be of an amorphous, glassy composition. This amorphous, glassy, silicious, cementing material is not, as a rule, satisfactory in aluminous abrasives. The nature of this cementing compound or eutectic between and surrounding the aluminous grains is of the greatest importance in determining abrasive fracture and abrasive hardness. Magnesium and titanium oxids in the proportion of their molecular weights, when fused with alumina in the right proportion and allowed to solidify under the right conditions, give a resulting product of very fine-grained, crystalline alumina, the spaces between and surrounding the individual crystals being filled with magnesium aluminate, magnesium titanate, and eutectics of these with alumina, which causes the resulting product to possess the proper abrasive hardness and abrasive toughness to give very efficient cutting action on hard steels and other hard metals.

A fused aluminous abrasive consisting of aluminium, magnesium and titanium oxids, in which the magnesium and titanium oxids are used in about the ratio of their molecular weights, that is, in a proportion of one part magnesium oxid to two parts titanium oxid, appears to have about the best combination of abrasive toughness and abrasive fracture for grinding the harder metals. This abrasive may be readily prepared by thoroughly mixing the oxids of aluminium, titanium and magnesium in the desired proportions and fusing the mass in an electric furnace into a homogeneous product. In commercial practice, however, an abrasive consisting of the oxids of aluminium, magnesium and titanium may be made by several other methods in which emery and other aluminous material form the raw products of the charge.

In one method, the emery, or aluminous material, containing the oxids of magnesium and titanium in the right proportions, is mixed with carbon in sufficient proportion to reduce all impurities, and charged into an electric furnace, and the entire mass fused. After fusion the mass is cooled and the abrasive material separated from impurities. In case the aluminous material does not contain magnesium and titanium oxids in the proper proportion, these oxids may be added to the mixture in the charge, or emerys having different chemical constitutions may be mixed to gage the proper proportions of magnesium and titanium oxids. Also, the iron oxid and silica content of the charge should preferably be gaged to have a ratio of approximately six to one. If this ratio does not exist in the aluminous material of the charge, separate ingredients should be added to approximately maintain this ratio in order to obtain satisfactory conditions in the furnace for the production of ferrosilicon as a by-product. The temperature of the furnace is maintained below the reduction temperature of the oxids of aluminium, titanium and magnesium, and by the fusion, the silicon and iron are reduced to form a ferro-silicon which is separated by settling, due to its greater specific gravity.

In another method of preparing the abrasive, the emery, or aluminous material, may be calcined either before or after mixing the same with carbon and then fused in an electric furnace. Reducing agents, other than carbon, may be employed to reduce the impurities from the material, as, for example, metallic aluminium or metallic magnesium, but any reducing agent which would serve in place of carbon comes within the purview of this invention.

The above processes are preferably conducted in a stationary electric arc-type furnace, one in which the electrodes are gradually raised as the charge is fused. By arc-type furnace wherever used in the specification and claims, it is not meant an electric furnace which necessarily derives all of its heat from the electric arc, but it is intended to cover any of the well-known types of electric furnaces which have been employed for various electro-metallurgical and electro-chemical purposes, which derive part of their heat from the arc and part by the passage of the current through the molten material. By the fusion, a pig of segregated metals, resulting from the furnace reduction, is formed at the bottom of the furnace and a pig of abrasive material is formed in the body of the furnace above the metal pig. These fused pigs and segregated materials may then be allowed to cool in the furnace. After cooling, the abrasive material is separated from the impurities, crushed, washed, and graded in preparation for its various uses. According to another process the fused abrasive material may be tapped from the electric furnace from time to time and poured in thin streams to cool, as described in my co-pending application Serial No. 26,626, filed May 7, 1915, for an electric furnace product or abrasive and the method of making the same.

I have prepared an abrasive product from emery which contained alumina ($Al_2O_3$) 95.5%, magnesia (MgO) 1.5%, and oxid of titanium ($TiO_2$) 3%. This product is an extremely hard, exceedingly tough, fine-grained crystalline material which has excellent abrasive properties and is substantially free from reduction products of aluminium and other metals. It is practically insoluble in water and acid solutions. This composition of fused oxids gives an excellent abrasive having a particular combination of abrasive fracture and abrasive toughness for use in the manufacture of grinding tools to be employed on a variety of hard steels.

Neither the oxid of titanium nor the oxid of magnesium alone gives the desired combination of abrasive toughness and abrasive fracture. With magnesium oxid alone the matrix between and around the aluminous crystals is of a different nature from that formed when both magnesium oxid and titanium oxid are employed together, as herein described. With oxid of magnesium alone the aluminous crystals are not as small and the structure is consequently not as fine-grained as when the magnesium aluminate, magnesium titanate, and eutectics of these with alumina are formed, as described above. The alumina magnesia products have not the same high degree of abrasive fracture and abrasive toughness that I have found the alumina magnesia titanium oxid compounds to have. Again, titanium oxid alone added to the alumina is frequently lost in the crystalline structure of the alumina, so as to be very difficult to detect in the crystalline structure by microscopic examination. The coarse crystalline structure is usually not prevented by titanium oxid alone. Other percentages of magnesium oxid and titanium oxid in combination, add to the desired abrasive fracture and abrasive toughness, and it is within the purview of this invention to include any composition consisting essentially of the oxids of aluminium, magnesium and titanium which is substantially free from impurities. The percentages of magnesium oxid and titanium oxid may be varied somewhat without masking the improved abrasive properties of the abrasive. However, when working with hard varieties of steels, it is desirable that the abrasive should not contain magnesium oxid and titanium oxid to an extent greater than three per cent. each, nor less than one-half of one per cent. each. Varying these oxids within these limits varies the temperature at which solidification commences, and gives rise to a series of mixtures of the eutectics and the compounds, together forming the crystalline mass with high abrasive qualities.

It has been found that relatively small proportions of impurities in the abrasive such as compounds of iron and of silicon exercise a profound influence upon the characteristics of the product.

According to this invention, the reduction conditions and temperatures of the furnace are so controlled that the final alumina abrasive product shall not contain a substantial proportion of iron oxid or silica, that is, a proportion of either iron oxid or silica in excess of one per cent. of the mass. The temperatures at which the furnace is required to be operated in reducing the impurities are such as to insure the reduction of the iron oxid and the silica, but are kept below the reduction temperature of alumina so as to prevent the production of sub-oxids or carbids of aluminium or other metals.

Heretofore, when aluminous abrasives have been manufactured from emery, it has been common practice to use foreign emery ores which are substantially free from magnesium oxid. The oxids of titanium and magnesium, and especially the oxid of magnesium, were considered objectionable in the final product and effort was made to use a raw material substantially free from the latter. For this reason, the use of American emery ores in the manufacture of abrasives, if any, has been very restricted. By my process, however, American emery ores having a comparatively large percentage of magnesium may be employed, and, by a careful manipulation of temperatures and reduction conditions of the furnace, an abrasive having substantially the proportions of magnesium required is produced which has excellent abrasive properties.

In the specification and claims the matrix is described as consisting of magnesium aluminate ($MgAl_2O_4$, or $MgO.Al_2O_3$), magnesium titanate ($MgTiO_3$, or $MgO.TiO_2$), and eutectics of these with alumina, by which it is intended to define the matrix as consisting of magnesium aluminate, magnesium titanate, and eutectics of either or both of these with alumina, or mixtures of any or all of these, it being understood that the magnesium aluminate, magnesium titanate and the eutectics of either or both of these with alumina may properly be regarded as mixtures or combinations of the oxids of aluminium, magnesium and titanium. If small amounts of iron are present in the fused product, the cementing eutectic or compound may of course contain magnesium iron titanate ($MgFeTiO_3$).

Having thus described the invention, what I claim as new is:—

1. The method of making a fused alumina abrasive comprising, fusing in an electric arc-type furnace an aluminium material containing a substantial amount of titanium oxid, magnesium oxid and impurities, reducing the impurities to a metallic state and separating the reduced material from the fused abrasive.

2. The method of making a fused alumina abrasive from emery, or other material containing oxids of aluminium, magnesium, silicon, iron, etc., and a substantial amount of titanium comprising, fusing the material with an electrically generated heat in the presence of sufficient carbon to reduce the oxid of silicon and iron to form ferro-silicon, then separating the fused magnesium, titanium and aluminium oxid composition from the ferro-silicon.

3. The method of making a fused alumina abrasive from emery or an aluminous material containing substantial amounts of oxids of magnesium, and titanium and some impurities, comprising, calcining the material in admixture with carbon, fusing the calcined mixture in an electrically developed heat, reducing the materials other than oxids of aluminium, magnesium and titanium, and separating the reduced impurities from the mixture.

4. The method of making a fused alumina abrasive from aluminous material containing substantial amounts of oxids of magnesium, and titanium and some impurities such as oxids of iron, silicon, etc., comprising mixing the material with carbon sufficient to reduce the impurities, fusing the alumina, magnesia and titanium oxid content by electrically developed heat, fusing and reducing the iron oxid, silica and impurity content, holding the temperature of the charge below the reduction temperature of alumina while reducing the impurities, and separating the reduced impurities from the mass.

5. The method of making a fused alumina abrasive containing substantial amounts of magnesia, and titanium oxid and some impurities, comprising mixing the material with sufficient carbon to reduce only the impurities, fusing the material in an electric furnace, holding the temperature of the furnace below the reduction temperature of aluminium, magnesium and titanium oxids, and separating the reduced material from the mass.

6. The method of making a fused alumina abrasive from aluminous material containing magnesia, titanium oxid and impurities, comprising fusing the mixture in an electric furnace, adding a reducing agent in sufficient quantity to substantially reduce all the impurities, pouring the unreduced fused portion of the mixture in thin streams to cool.

7. The method of making a fused alumina abrasive from a mixture of materials containing oxids of aluminium, magnesium, titanium, silicon and iron, comprising gaging the charge until the ratio of iron oxid to silica is approximately six to one, adding sufficient carbon to reduce the iron and silicon content, fusing the mass with an electrically generated heat, cooling and separating the reduced iron and silicon impurities.

8. The method of making a fused alumina abrasive from a mixture of materials containing oxids of aluminium, magnesium, titanium and impurities, comprising gaging the charge so that the ratio of magnesium oxid to titanium oxid is approximately one to two, adding sufficient quantities of a reducing agent to reduce the impurities, fusing the mass with an electrically generated heat, cooling and separating the reduced impurities from the abrasive product.

9. As an article of manufacture, a fused aluminous abrasive, comprising alumina, and at least one-half per cent. each of titanium oxid and magnesium oxid, characterized by its abrasive toughness and abrasive fracture.

10. As an article of manufacture, a previously molten aluminous abrasive consisting essentially of aluminium oxid, titanium oxid, magnesium oxid, and substantially free from impurities and reduction products of alumina.

11. As an article of manufacture, a previously molten material possessing a fine-grained crystalline structure, characterized by its hardness, abrasive toughness, and abrasive fracture, consisting of small crystals of alumina, surrounded by a cementing matrix of magnesium aluminate, ($MgAl_2O_4$, or $MgO.Al_2O_3$) magnesium titanate ($MgTiO_3$ or $MgO.TiO_2$), and eutectics of these with alumina.

12. As an article of manufacture a fused aluminous abrasive comprising, small crystals of alumina embedded in a matrix containing magnesium aluminate and magnesium titanate.

13. As an article of manufacture a fused aluminous abrasive comprising, a mass of small alumina crystals embedded in a matrix of eutectics of magnesium aluminate and magnesium titanate with alumina.

14. As an article of manufacture a fused aluminous abrasive comprising, a body of small alumina crystals embedded in a matrix containing eutectics of magnesium and titanium oxids with alumina.

15. As an article of manufacture, a fused homogeneous crystalline product consisting essentially of alumina, magnesium oxid and titanium oxid, the titanium and magnesium oxids being in approximately the ratio of their molecular weights.

16. As an article of manufacture, a fused alumina abrasive having a homogeneous crystalline structure consisting essentially of aluminium oxid, magnesium and titanium oxids, being substantially free from iron and silicon and the reduction products of alumina, the proportion of magnesium and titanium oxids being not less than one-half of one per cent. each nor greater than three per cent. each.

17. As an article of manufacture, a fused alumina abrasive comprising alumina, titanium oxid and magnesium oxid, the proportions of said titanium and magnesium oxids being not greater than three per cent. each, characterized by its abrasive toughness and abrasive fracture.

18. As an article of manufacture, a fused alumina abrasive comprising alumina, titanium oxid and magnesium oxid, the proportions being in the order named, characterized by its abrasive toughness and abrasive fracture.

HERBERT T. KALMUS.